Patented Aug. 31, 1937

2,091,367

UNITED STATES PATENT OFFICE 2,091,367

AZO DYESTUFFS AND THEIR PRODUCTION

Arthur Howard Knight, Blackley, Manchester, England, assignor to Imperial Chemical Industries Limited, a corporation of Great Britain No Drawing. Application April 22, 1935, Serial No. 17,735. In Great Britain April 25, 1934

11 Claims. (Cl. 260—96)

This invention relates to new compositions of matter, being dyestuffs, to methods of preparing them, and to compounds dyed with them.

In copending application Serial No. 7,661, filed February 21, 1935 there is described a group of chemical products which are arylamines, which may be N-substituted by alkyl or hydroxy-alkyl groups, and which are condensed with an appropriate number of equivalents of ethylene oxide, or of an equivalent substance such as ethylene chlorhydrin. The primary amines are preferably of the benzene or naphthalene series and they are condensed with at least three equivalents of ethylene oxide in the case of the simple amine and with at least two molecules of ethylene oxide in the case of N-substituted amines. The substances formed are new dyestuff intermediates. In copending application Serial No. 7,660, filed February 21, 1935 there is described the manufacture of sulfato derivatives of the intermediates described in the above-identified copending case. These sulfato derivatives of the polyethenoxyarylamines are made by treating them with agents capable of converting the—$CH_2OH$ groups into the—$CH_2OSO_3H$ groups, or into a water-soluble salt thereof. Among the sulfating agents whose use is described in that application are concentrated sulfuric acid, fuming sulfuric acid, chlorosulfonic acid, and sodium pyrosulfate. Other such agents may be known to chemists skilled in the art. In copending application Serial No. 7,659, filed February 21, 1935 there is described the manufacture of new monoazo dyestuff by combining a diazotized aniline or a diazotized naphthylamine with a compound of the type described in the said identified copending application Ser. No. 7,661. The diazotized arylamines described in said application are useful in making the dyestuffs of this invention.

It is an object of this invention to make new dyestuffs and to develop satisfactory processes of making the said new dyestuffs. Another object of the invention is to make water-soluble dyestuffs.

The objects of this invention are attained, generally speaking, by coupling a diazotized arylamine, and preferably a diazotized nitroarylamine, to a sulfatopolyethenoxyarylamine having one N-substituted alkyl group. Alternatively, the diazotized arylamine may be coupled to a polyethenoxyarylamine, the so-formed compound being treated to form the sulfato compound as described in the above-identified application.

The following examples illustrate but do not limit the invention. In these examples parts are by weight.

Example I 138 parts of p-nitroaniline are diazotized in the known way. 333 parts of the sulfuric ester of the product of condensation of 121 parts of N-ethylaniline and 132 parts (three equivalents) of ethylene oxide obtained by the methods described in copending application Serial No. 7,660 are dissolved in 4,000 parts of water containing sufficient caustic soda to give a faintly alkaline reaction to Brilliant Yellow paper. 204 parts of sodium carbonate are then added and the mixture is cooled to 5° C. The cooled diazo solution is then added with good agitation to this solution during about a quarter of an hour. Coupling is rapid and when it is complete the dyestuff suspension is heated to 80° C. a little salt is added to complete the separation and the dyestuff is filtered off and preserved as a paste or dried in any suitable way. The dyestuff is soluble in water. It dyes acetate artificial silk in scarlet red shades of good light fastness and dischargeability when applied from an acid dyebath, or from a neutral dyebath containing 3% salt. It can also be used for the direct printing of acetate artificial silk. When applied from an acid bath it dyes wool, silk, tin-weighted silk and leather in red shades.

Example II 69 parts of sodium nitrite are added to 1,480 parts of 100% sulfuric acid and stirred until no solid remains, then 222 parts of 6-chloro-2:4-dinitroaniline are added with stirring during two hours and stirring is continued until no solid matter remains. The resulting solution is then heated to 50° C. and kept at that temperature for two hours. It is then cooled to 20° C. 405 parts of the sulfuric ester of the product of condensation of 237 parts of N-butyl-beta-hydroxyethyl-meta-amino-para-cresol methyl ether and 88 parts (two equivalents) of ethylene oxide obtained by the methods described in copending application No. 7,660 are dissolved in 4,000 parts of water containing sufficient caustic soda to render the solution faintly alkaline to Brilliant Yellow paper. 136 parts of sodium acetate are then added and the mixture is cooled to 0° C.

The sulfuric acid solution is then added slowly to the solution of the coupling component and simultaneously 40% aqueous caustic soda is added at such a rate that the mixture is kept to no more than faintly acid to Congo Red paper nor alkaline to Clayton Yellow paper. Ice is added from time to time to keep the temperature at 0° C.

When coupling is complete the dyestuff suspension is heated to 80° C. and filtered. The dyestuff paste obtained contains sodium sulfate; it is stirred into 10,000 parts of water to dissolve this. The suspension is heated to 80° C. and the dyestuff is filtered off. It is preserved as paste or dried in any suitable way.

The dyestuff is soluble in hot water and dyes acetate artificial silk from a neutral dye-bath containing 3% salt, giving reddish-blue shades of good fastness properties and good dischargeability. It is also very suitable for printing acetate artificial silk.

*Example III*

172.5 parts of o-chloro-p-nitroaniline are diazotized in the known way, using 8,000 parts of water, 1,110 parts of 10% hydrochloric acid and 69 parts of sodium nitrite.

289 parts of the sulfuric ester of the product of the condensation of 121 parts of N-ethylaniline and 88 parts (two equivalents) of ethylene oxide obtained by the methods described in copending application Ser. No. 7,660 are dissolved in 4,000 parts of water containing enough caustic soda to render the solution faintly alkaline to Brilliant Yellow paper. 260 parts of sodium carbonate are then added and the mixture cooled to 5° C.

The cooled diazo solution is then added with good agitation during about a quarter of an hour. When coupling is complete the dyestuff suspension is heated to 80° C. salt is added to complete the separation, and the dyestuff is filtered off and preserved as a paste or dried in any suitable way.

The dyestuff is soluble in water. It dyes acetate artificial silk in bluish-crimson shades when applied from an acid dyebath or from a neutral dyebath containing 3% salt. It is also suitable for use in printing acetate artificial silk.

When applied from an acid bath it dyes wool, silk, tin-weighted silk and leather in bluish-red shades.

*Example IV*

183 parts of 2,4-dinitroaniline are diazotized by means of nitrosyl sulphuric acid in the usual way and the aqueous solution obtained after pouring the sulphuric acid solution of the diazo compound into ice and water and filtering is slowly added to a stirred solution at 0–5° C. of 303 parts of the sulphuric ester of the product of condensation of 135 parts of N-ethyl-m-toluidine and 88 parts (two equivalents) of ethylene oxide, in 4,000 parts of water containing 40 parts of caustic soda. Aqueous caustic soda (10N) is added simultaneously to the coupling medium at such a rate that the medium is kept just mineral acid. Ice is also added from time to time to keep the temperature of the coupling medium at 0–5° C.

When coupling is complete the dyestuff suspension is rendered just alkaline with caustic soda and the dyestuff filtered off, washed with 5% brine solution and preserved as paste or dried in any suitable way.

When applied from a neutral dye-bath containing 3% salt it dyes acetate artificial silk in bright violet shades of good light fastness and dischargeability.

The new dyestuffs are soluble in water and dye acetate artificial silk from an acid, neutral, or alkaline dyebath in yellow, orange, red, brown, violet, and blue shades of good fastness properties and dischargeability. They are also very suitable for the direct printing of acetate artificial silk. Also when applied from an acid bath they dye wool natural silk and tin-weighted silk in yellow, orange, red, brown, violet, and blue shades. They are also suitable for the dyeing of leather when applied in the usual way for acid dyestuffs.

As many apparently widely different embodiments of this invention may be made without departing from the spirit and scope thereof, it is to be understood that I do not limit myself to the specific embodiments thereof except as defined in the appended claims.

I claim:

1. A dyestuff, being the product:

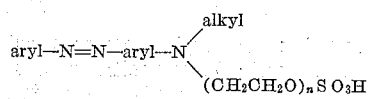

in which $n$ is between 1 and 11, and aryl is of the benzene series.

2. A dyestuff, being the product:

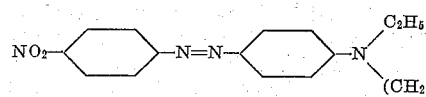

3. A dyestuff, being the product:

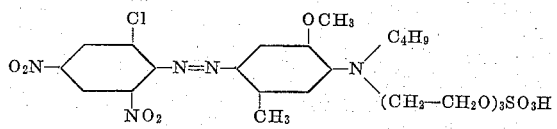

4. A dyestuff, being the product:

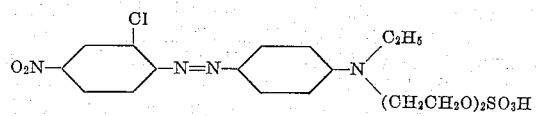

5. The process of preparing an azo dyestuff which comprises coupling diazotized arylamine to a compound having the formula:

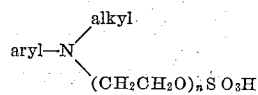

in which $n$ is between 1 and 11, and aryl is of the benzene series.

6. The method of making a dyestuff which comprises coupling a diazotized nitroarylamine to the compound having the formula:

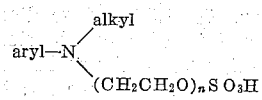

in which $n$ is between 1 and 11.

7. The method of making a dyestuff which comprises coupling a diazotized nitroaniline to the compound having the formula:

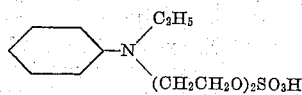

8. The method of making a dyestuff which comprises coupling a diazotized nitroaniline to a compound having the formula:

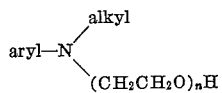

in which $n$ is between 1 and 11, and forming the sulfuric ester of the resulting compound, and aryl is of the benzene series.

9. The method of making a dyestuff which comprises coupling a diazotized nitroaniline to a compound having the formula:

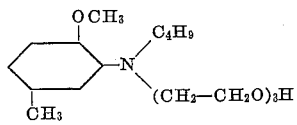

and making the sulfuric ester of the resulting compound.

10. The process of making a sulfato dyestuff which at one stage involves the sulfating of a group

and in another stage involves the coupling of a diazotized aryl-amine to a compound having the formula:

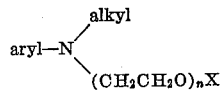

in which X is a member of the group consisting of H and SO₃H, and $n$ is between 1 and 11.

11. The process of making a sulfato dyestuff which at one stage involves the sulfating of a group

and in another stage involves the coupling of a diazotized aryl-amine to a compound having the formula:

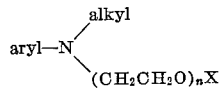

in which X is a member of the group consisting of H and SO₃H, $n$ is between 1 and 11, and aryl is of the benzene series.

ARTHUR HOWARD KNIGHT.